Figure 2:
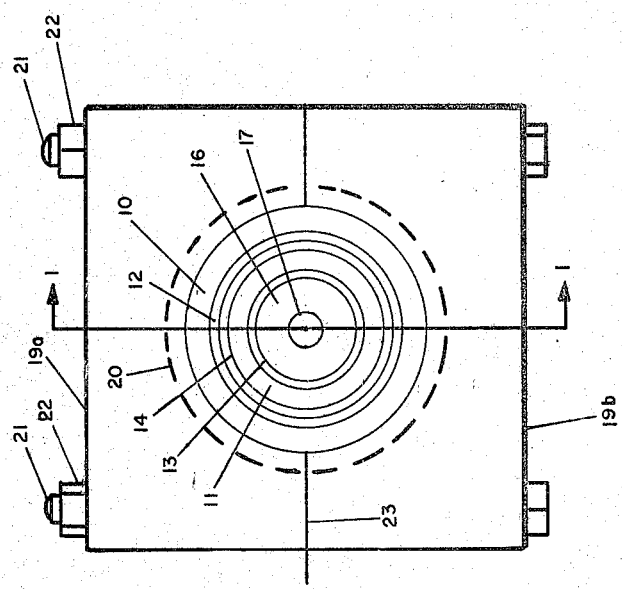

Dec. 13, 1966  D. SILVERMAN ETAL  3,290,771
METHOD AND APPARATUS FOR JOINING LINED TUBULAR ELEMENTS
Filed July 15, 1965  3 Sheets-Sheet 1

INVENTORS.
*Daniel Silverman*
*Harold M. Lang*

Dec. 13, 1966    D. SILVERMAN ETAL    3,290,771
METHOD AND APPARATUS FOR JOINING LINED TUBULAR ELEMENTS
Filed July 15, 1965    3 Sheets-Sheet 3

Daniel Silverman
Harlet M Lang    INVENTORS.

United States Patent Office 3,290,771
Patented Dec. 13, 1966

3,290,771
METHOD AND APPARATUS FOR JOINING LINED TUBULAR ELEMENTS
Daniel Silverman and Harold M. Lang, Tulsa, Okla., assignors to Shok Lok Co., Tulsa, Okla., a co-partnership
Filed July 15, 1965, Ser. No. 472,244
45 Claims. (Cl. 29—421)

This is a continuation-in-part of our copending application Serial No. 250,417 filed January 9, 1963, entitled "Coupling Means for Tubular Elements," now abandoned.

This invention relates to the art of joining pipes or tubular elements to form extended conduits. More particularly it is concerned with the joining of thin-walled metal pipes or tubes which have been lined with corrosion protection materials, such as plastic paints or tubes or very thin-walled metal tubes.

In the transportation of fluids through pipes, contamination of the fluid, and/or destruction of the pipe by physical and/or chemical interaction between the transported material and the pipe itself is often a serious problem. One way to minimize this problem is to construct the pipe of a material that does not react with the transported material. This is generally an expensive process. Another way is to line the pipe with a third material that does not react with the pipe or the fluid. This method has found considerable acceptance, even though it has a serious weakness, namely, that the material with which the pipe is lined is coextensive with each length of pipe, and there has been no satisfactory way to seal (at the pipe joint) the space between the ends of the liners. This invention is directed toward the steps of mechanically, hydraulically, and/or explosively joining the pipe segments, and the sealing of the joint between the sections of the lining so that the pipe material is completely shielded from possible contact with the fluid within the pipe.

In one form such linings may consist of a layer of paint, plastic, tar, or similar material applied directly to the inner surface of the pipe. Another means of installing a lining consists of positioning within the pipe a flexible, thin-walled tubular liner which is expanded against the inner surface of the pipe and retained in this position by adhesive or other means. Flexible tubular linings of this type may be composed of selected plastics such as polyethylene, polypropylene, plasticized polyvinylchloride, or other compositions which are, in general, somewhat elastic and/or are plastically deformable.

Additionally, many of the elastomers, both natural and artificial, such as latex rubbers, neoprene, silicone elastomers, etc., are also suitable for use as liners. Also, very thin-walled metal pipes or tubes of appropriate material can be used. The choice of the lining material is made in consideration of the fluids with which it will come in contact when placed in service.

If a suitable liner material can be found to protect the pipe, then only a thin-walled pipe need be used, since all that the pipe needs to do is reinforce the liner. Although the joining of thin-walled pipes is a difficult process, we have, in our copending application S.N. 455,556 filed May 13, 1965, entitled "Method of Simultaneously Deforming Two Overlapping Tubular Metal Elements To Form Interlocking Ridges," taught how to join thin-walled pipes by simultaneously explosively deforming an overlapped pair of pipes against a third encircling element. This application is directed to the extension of that and other pipe joining methods to the joining and sealing of lined thin-walled tubular elements.

In this invention we use thin-walled pipes which are lined by either of the two types of linings mentioned earlier. Consider the use of a preformed thin-walled tubing of plastic substantially equal in diameter to the inner diameter of the pipe. This is inserted into the pipe, with a length extending beyond the end of the pipe. This length is turned back over the end of the pipe like a cuff. Next the connecting coupling or collar, of diameter slightly larger than the pipe, is lined with a length of thin-walled tubing, and the lined collar slipped over the end of the pipe with its cuff. The two metal tubes are overlapped with two layers of plastic tubing inbetween. The internal surfaces of the pipe and the collar are completely covered wtih plastic. All that remains is to press together the pipe and the collar so tightly that a pressure-tight, strong, mechanical joint is made. This can be done in many ways, although the method outlined in our copending application S.N. 455,556 is ideal. This involves encircling the collar with a tight fitting metal ring of high yield strength, and creating an explosive shock pressure inside of the inner pipe, to drive the inner pipe toward the collar and both of them toward the encircling ring, to compress and hold the tubular elements. As an alternative method, where the lining is painted, flowed, or sprayed on the inside of the pipe, the joint can be covered on the inside by an inside collar with a length of plastic tubing between it and the pipe lining. This collar would be of noncorrosive character. Alternately, the inner collar may be molded in plastic (to protect it from the fluid) and explosively set in position over the joint in the lining.

The principal object of this invention is to provide a novel and improved method of joining lined thin-walled tubular elements to provide a strong mechanical joint and a completely covering liner between the tubular elements and the fluid within the elements. Another object is to use pipe lined with painted or sprayed-on linings. Another object is to use pipes lined with separately formed thin-walled plastic tube linings, or preformed linings of thin sheet metal.

Figure 1:
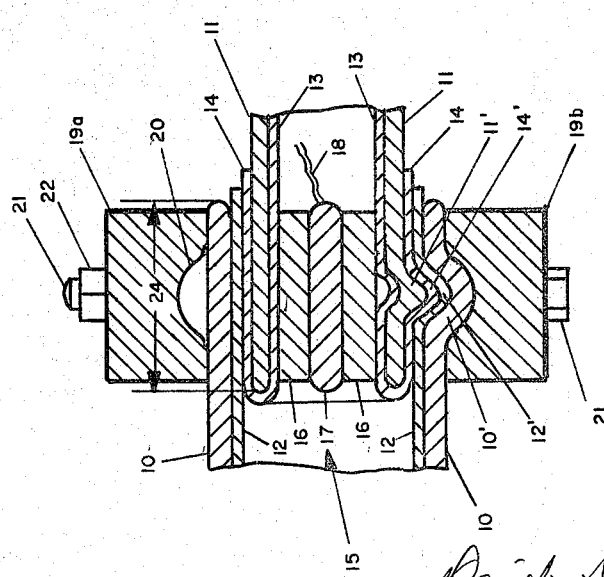
Figure 3:
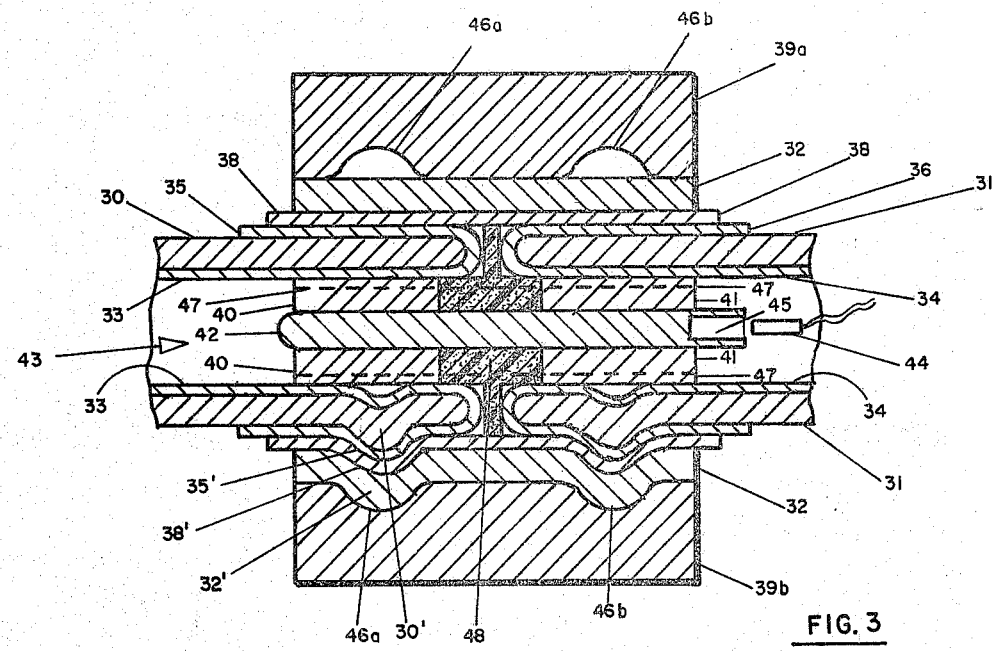
Figure 4:
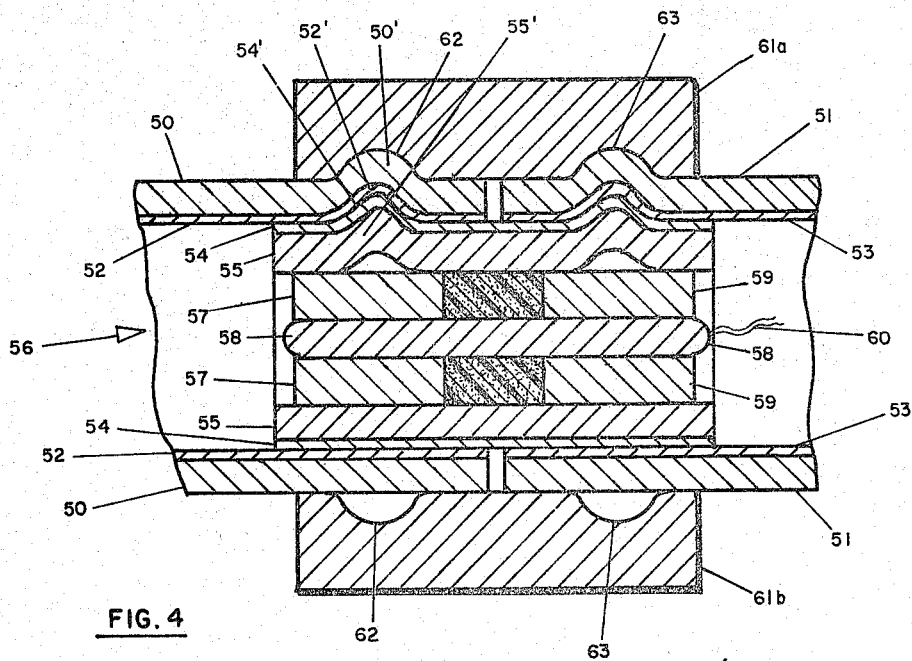

Still other objects and details of our invention will become apparent in connection with the following drawings and description of several embodiments of our invention, in which FIGURES 1 and 2 show in two views one embodiment in which lined pipes of different diameters are joined together, FIGURES 3 and 4 show other embodiments in which two lined pipes of the same diameter are joined to a third tube or coupling outside (FIGURE 3) or inside (FIGURE 4) of the pipes.

Figure 5:
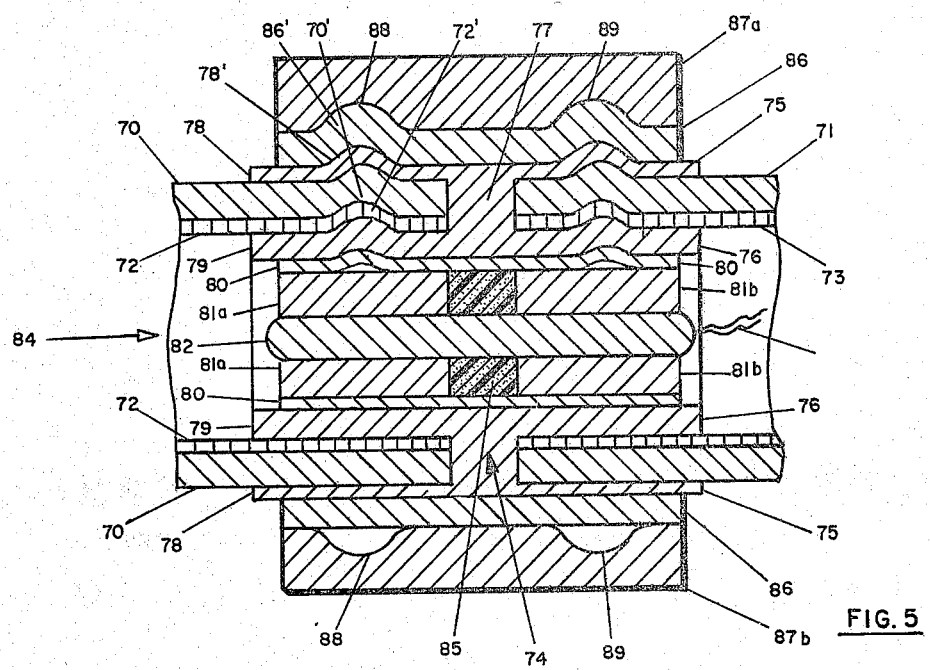
Figure 6:
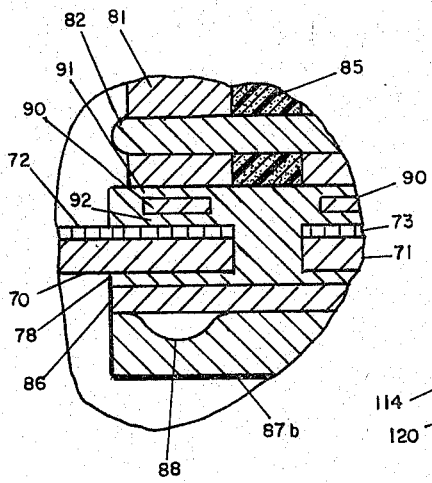
Figure 7:
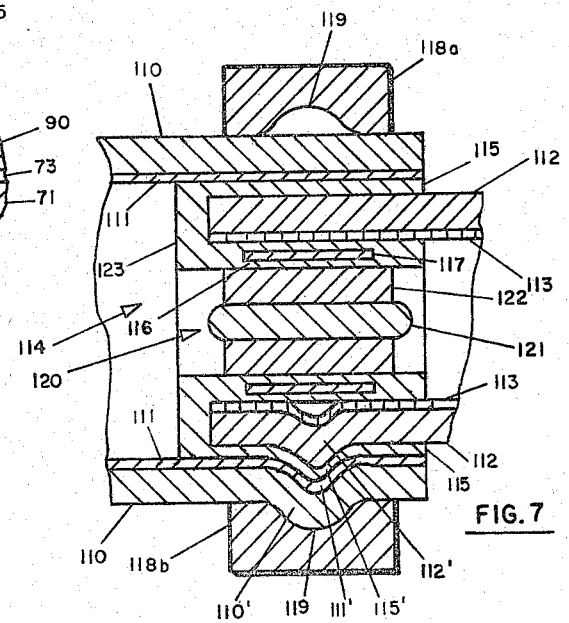

FIGURES 5, 6 and 7 show embodiments in which the pipe linings extend only to the ends of the pipes and the coupling means provides a third lining overlapping the ends of the two pipe linings. FIGURES 5 and 6 are for pipes of equal diameter and FIGURE 7 for pipes of different diameters.

Referring now to the drawings and in particular to FIGURES 1 and 2, we show in axial section and transverse view respectively one embodiment of our invention. Two pipes 10 and 11 of thin-walled metal construction are lined with thin-walled plastic tubing 12, 13, respectively. The tubing 13 is extended through pipe 11 and the extended part is turned back 14 over the end of the pipe 11. The material of which the tubing is made is sufficiently resilient that it can be stretched in this way. The two pipes are of the proper diameters such that they will fit in snug overlap fit with the two layers of plastic 12 and 14 in between. Outside of pipe 10 is clamped a removable two-piece ring or anvil 19, with halves joining on a diametral plane 23. These halves can be held together, tightly clamped about 10, by any convenient means, such as the bolts and nuts 21, 22. The inside of the clamp ring is bored to provide one or more circumferential troughs or depressions 20, or other pattern of troughs or ridges as shown in our copending application Serial No. 455,556. Inside the inner lining 13 is placed an explosive assembly 15 which is used to provide the shock force necessary to deform and lock together the two pipe elements. This may consist of an elongated volume of explosive composition 17 with a ring 16 of material characterized as substantially incompressible, deformable, explosive shock force transmitting material. This is in snug fit on its inner surface with the explosive composition 17, and on its outer surface with the lining 13 and pipe 11. Thus the ring 16 can transmit with high efficiency the shock force generated by the explosive, to the pipes, forcing them into intimate contact. Many variations in the manner in which the inner pipe 11 can be driven outwardly to the pipe 10 are illustrated in our copending application Serial No. 455,556. Any one of these can be used in this application to join the pipes, although this application is not limited to explosive means. Other mechanical or hydraulic means known in the art can be used to join these pipes provided only that they can be used with the lining materials. While it is not necessary, in this application to use the anvil 19, or equivalent fixed ring, or the patterns of ridges or troughs or depressions against which to deform the pipes, so long as the force with which the pipes are pressed together is sufficient to form a strong joint, it will probably be helpful to follow the teaching of the application Serial No. 455,556.

In the top portion of FIGURE 1 we show how the pipes 10 and 11 and linings are positioned before detonating the explosive 17. In the lower portion we show in section how the tubes are deformed by the explosive pressure. Matching ridges and depressions are formed in the tubes 10 and 11 which lock them tightly together. After the detonation the anvil 19 is removed from the joint by removing nuts 22 and separating the two halves of the ring. The explosive assembly 15 and anvil 19 must be positioned such that the pattern of depressions 20, and material of ring 16 are lined up together, and substantially in the center of the overlap zone of the pipes 24. The length of this overlap zone, should be at least equal to the radius of the inner pipe, and preferably should be in the range of 1 to 4 times the radius. The axial dimension of the depression 20 should be of the order of about twice the thickness of the pipe.

In FIGURE 3 we show a variation of the embodiment of FIGURES 1 and 2. In the latter, pipes of two different diameters, or two pipes of the same diameter, with one end of one pipe belled out to slip over the unbelled end of the other pipe, are joined. In FIGURE 3, we use a third element, a short tube, collar, or coupling, to join the ends of two pipes of substantially the same diameter.

As before, tubular elements or pipes 30 and 31 are lined with plastic liners 33 and 34, respectively, which are overlapped over the abutted ends of the pipes 30, 31. The collar or coupling 32 which is a tubular metal element, with liner 38 in place, surrounds the joint and two pipe ends in symmetrical fashion. Outside of the collar is a wide clamp ring or anvil 39, composed of at least two parts 39a, 39b, with a pattern of depressions 46a, 46b, in the inner surface. Inside the two pipes 30, 31, is symmetrically placed an explosive assembly 43 which typically would be constructed with a central elongated explosive unit 42, surrounded by a multiplicity of rings of deformable substantially incompressible nonporous explosive shock force transmitting material 40, 41. The rings of force transmitting material are in intimate, contiguous shock force transmitting contact with the explosive element 42 and the liner covered pipes 30, 31. As described in our copending application Serial No. 455,556 these rings of shock force transmitting material can be made of elastic solids such as rubber or other elastomers, wax, grease, jells, or incompressible liquids enclosed in flexible plastic containers, etc.

If it should happen that the plastic liners 33, 34, are mechanically weak and are damaged by the shock force transmitted through it from the force transmitting material, it may be desirable to use a thin liner of metal, shown dotted as 47, between the force transmitting material 40 and 41 and the plastic liner. These can be left in place, and if so, should be made of noncorrodable metal. Or alternatively, they can be made of very thin metal and thus easily removable.

As in FIGURE 1, we show in the upper portion of FIGURE 3 the arrangement of pipes, collar and plastic before the detonation, and in the lower part of the figure, the arrangement after the detonation. We see that the tube 32 is bulged out, 32′, into the depression 46a, while the pipe 30 is bulged, 30′, into the depression formed in the inner surface of the tube 32′, with the plastic linings 38′ and 35′ intervening. The interlocking troughs and ridges thus formed in the mating surfaces of the pipes 30, 31, and collar 32, serve to lock the joint, while the internal pressure on the plastic layers seals the joint against fluid leakage.

The depressions 46a, 46b, must be symmetrically placed over the overlap areas of the pipes 30, 31, and the collar 32. Similarly, the force transmitting rings 40, 41, should be lined up with the depressions 46a, 46b. If desired, the space between the rings 40, 41, may be filled with a porous, lossy, compressible material 48, which, though mechanically firm, is a poor transmitter of shock waves. As described in our copending application Serial No. 455,556 this central ring may be made of foam plastic, papier mache and like materials incapable of efficiently transmitting explosive shock forces. It will serve to center the explosive assembly in the joint and thus ensure alignment between the rings 40, 41, overlap areas and anvil. Also shown in FIGURE 3 is a separate detonator 44, which can be inserted into the open end 45 of the explosive element prior to detonation.

While we have talked of thin-walled, flexible liners which are made from some inert material, such as one of the many modern plastics, it is possible also to use a very thin walled metal liner. Such a liner must be made of metal which would be inert to the particular fluid in the pipe, and should be ductile enough to be spun, or otherwise turned back over the end of the pipe.

In FIGURE 4, we show a variation of FIGURE 3 in which the metal tube or collar 55 is now smaller than the pipe (rather than larger) and with its liner 54, is placed inside the pipes 50, 51, with their linings 52, 53. In this case the linings 52, 53, need not project beyond the ends of the pipes 50, 51, since their ends will be covered by the liner 54 and the collar 55. Also, it is doubtful whether the liner 54 is needed, since the tube 55 pressing on the linings 52, 53, will seal them against fluid. Of course, the tube or collar 55 must be made of a metal which is inert to the fluid in the pipe. This arrangement is ideal for the use of thin-walled metal liners since they need not be turned over the end of the pipe.

In FIGURE 4, we show the explosive assembly placed into the inner collar 55 and the collar, with or without its liner 54, placed symmetrically into the ends of the lined pipes 50, 51. Our copending application Serial No. 455,556 shows ways in which these elements can be placed in proper alignment. The anvil 61 is put in place, the explosive 58 detonated and the anvil removed. We show in the bottom portion of the figure the original arrangement of pipes, liners, and collar, while in the upper portion of the figure we show the configuration of these elements after detonation.

As shown in our copending application S.N. 455,556, the encircling ring or anvil, can in any of our embodiments be a removable ring that is used only to restrain the outer member during detonation, and is then removed, or it can be a one piece ring about which the various elements are deformed and which remains part of the joint. Or it can be a helix of steel wire closely encircling the collar. This too will remain part of the joint after detonation. Also, the novelty of the invention resides in the arrangement of linings and structure, so that the joint can be formed by pressing the pipes and collars together in any desired way, such as by means of the explosive shock force described, or by hydraulic pressure, or by rolling ridges or depressions simultaneously through the layers of metal and linings in relation to an encircling ring or anvil.

In FIGURE 5, we show another embodiment of this invention which is, like FIGURE 4, adapted to the joining of pipes which have a lining applied to their internal surfaces, which extend up to, but not beyond the ends of the pipes. This class of lining includes the class shown in FIGURES 1, 2, 3, and 4, namely, the separable thin-walled tubular linings of plastic or metal. This is also a class of linings which are not separate tubular structures, but are formed directly on the internal surface of the pipe by applying a liquid, emulsion, powder, slurry, or other mixture and painting, spraying, spreading, spinning, or otherwise covering the internal surface of the pipe. The coating can be hardened to become mechanically strong by drying, polymerizing, baking, or setting. Examples of such materials are heavy oils, tars, plastics, cements, etc. In general, these materials make coatings which are quite satisfactory over the central area of the pipe, but often are poor in the vicinity of the ends of the pipe. Thus, in joining the pipes, the ends must be protected. This we propose to do by means of a plastic liner such as 54 of FIGURE 4 or as in FIGURE 5, the plastic element 74 with its central hub 77 and its four tubular portions 75, 76, 78, and 79. This provides two annular cavities between cylinders 78–79 and 75–76 into which the pipes 70, 71 are inserted. The annular radial spacing is sufficient to include the pipes 70, 71 and their linings 72, 73. In this position the inner surface of 79, 76 is continuous and covers the ends of pipes 70, 71 and linings 72, 73.

As in the case of the embodiment of FIGURE 3, we place a coupling or collar tube 86 on the outside surface of 74, and an explosive assembly 84 inside the inner surface of 74. In order to hold the inner tube of 74 in tight contact with the linings 72, 73, we may use a thin-walled metal tube of inert material 80 inside of 79, 76. When the explosive assembly 84 is detonated, the shock force generated by the explosive 82 is transmitted by rings of force transmitting material 81, to the tube 80, tubing 79, 76, lining 72, 73, pipes 70, 71, tubing 78, 75, and collar 86, to drive these many layers to, and to be deformed against, the internal convolutions of the anvil 87. As before, the pipes are joined by the simultaneously formed interlocking ridges and depressions while the joint in the lining 72, 73 is sealed by tubing 79, 76, held in place by the tube 80. This deformed situation is shown in the upper portion of the figure, while the configuration before detonation of the explosive assembly is shown in the lower part of the figure. Here, as in FIGURE 3, we show a ring 85 of compressible porous material to assist in mechanically spacing and holding the parts of the explosive assembly 84.

In FIGURE 6, we show in partial section how the tube 80 might be broken into two short tubular rings 90 which are molded into the material of the assembly 74 so that the strength of the metal 90 is provided to press the plastic lining 92 into intimate contact with the pipe lining 72, and still be covered by plastic layer 91, and so protected from contact by the fluids in the pipe.

While the embodiment of FIGURE 5 showing the molded sealing assembly 74 has been chosen to illustrate the joining of two pipes with a coupling tube or collar, the same principles can be applied equally well to the case of FIGURE 1 where two lined tubular elements of different diameters are joined. This is shown in FIGURE 7 in which pipe 112 with lining 113 is slipped into molded sealing assembly 114 comprising a double-walled tube with base 123 and walls 115, 116. A tubular metal insert 117 can be molded into the inner wall. The explosive assembly 120 comprising explosive composition 121 and shock force transmitting ring 122 is placed inside the tubing 116. The second pipe 110 with its lining is overlapped over the end of 112 to form an overlap section, and the anvil 118 with internal surface convolution 119 is clamped on the outside. The action on detonation of the explosive composition is similar to that described for the other embodiments.

We have, by the use of various illustrations, described specific embodiments of our invention. However, various changes and modifications to these embodiments will become apparent to those skilled in the art, and may be made without departing from the scope of this invention which is to be determined by the scope of the appended claims.

We claim:
1. The method of joining together two tubular metal elements of different diameters each containing a separate thin-walled liner comprising
   (a) inserting a first liner into the smaller of said elements so that said liner extends beyond the end of said element by a distance approximately equal to D,
   (b) folding back over the end of said element said extended tubing in the form of a cuff,
   (c) inserting a second liner into the larger of said elements so that the liner comes at least to the end of said element,
   (d) inserting said cuffed end of said smaller element into the lined end of said larger element a distance approximately D,
   (e) forcing together in intimate relation said inner and outer metal element and said two intermediate liners.
2. The method as in claim 1 in which the said length D is at least equal to the radius of the inner element.
3. The method of claim 1 in which D is in the range of 1—4 times the radius of the inner element.
4. The method of claim 1 in which said elements are forced together by means of an explosive shock force applied to the inner surface of the inner lined element.
5. The method of joining two lined metal tubular elements in which said linings are coextensive with the ends of said elements comprising,
   (a) abutting the ends of two axially aligned lined elements of substantially the same diameter,
   (b) inserting one into the other, a length approximately 2D of tubular metal coupling and said abutted elements, such that at least one layer of lining exists between said elements and said tube, said tube is centered over said joint, and,
   (c) pressing tightly together by means of radial force said elements and said coupling, while compressing the lining therebetween.
6. The method of claim 5 in which said coupling is lined and the lined coupling is placed over the ends of said elements and centered over the joint.
7. The method of claim 5 in which said coupling is inserted into the lined elements and centered with respect to the joint.
8. The method of claim 7 with an additional thin-walled liner inserted between said coupling and said lined elements.
9. The method of joining together two tubular metal elements of the same diameter, and lined with a thin-walled flexible liner, comprising
   (a) inserting a first liner into a first element with the liner extending beyond the end of said element,
   (b) turning back over the end of the element said tubing to form a cuff,
   ( )c repeating (a) and (b) for the second element,
   (d) lining a short length of tubular coupling and inserting the cuffed ends of said elements into said lined coupling, so that said coupling is symmetrical with respect to the joint between the elements, and
   (e) forcing said elements outward against said coupling, whereby said elements are joined together.
10. The method of claim 9 with the additional steps of
   (a) inserting an explosive assembly into the inside of said ends of said lined element, and

(b) detonating said explosive assembly.

11. The method of claim 9 with the additional steps of
   (a) preparing a removable ring with its inner surface a pattern of projections and depressions,
   (b) placing said ring tightly around said coupling,
   (c) inserting an explosive assembly into the interior of said elements at said joint, and
   (d) detonating said assembly and removing said ring.

12. The method of joining two tubular metal elements lined with a protective material at least coextensive with the length of said elements comprising the steps,
   (a) preparing a seal assembly of deformable, substantially incompressible material formed as two oppositely directed pairs of thin-walled cylinders, concentric, and with an annular space therebetween, adapted to receive in each end of said assembly one end of a lined element, said inner cylinders forming a continuous tubular liner covering the ends of said elements, and the outer cylinders forming a corresponding tubular cover on the outside of said elements,
   (b) inserting a thin-walled metal cylinder adapted to snugly fit the tubular liner inside said elements,
   (c) slipping over the outside tubular cover a metal tubular coupling, said metal cylinder and said metal coupling substantially coextensive with said tubular liner, and
   (d) forcing said metal cylinder outward against said tubular liner, said lined elements and said tubular cover, into intimate contact with said coupling.

13. The method of claim 12 with the additional steps of
   (a) encircling said outer coupling with at least one metal ring adapted to restrain expansion of said coupling,
   (b) inserting an explosive assembly inside said metal cylinder and,
   (c) detonating said explosive assembly.

14. The method of claim 13 with said ring composed of at least two pieces and adapted to be tightly clamped around said coupling.

15. The method of claim 13 in which said ring is of one piece construction adapted to remain surrounding said coupling after the detonation of said assembly.

16. The method of claim 12 in which said thin-walled metal cylinder is molded within the tubular liner forming the inner cylinder of said seal assembly.

17. The method of joining two lined tubular elements, the linings being substantially coextensive with said elements, said elements of different diameters, comprising
   (a) preparing a seal assembly comprising an annular cup constructed of flexible substantially incompressible material, the annular space adapted to receive the end of a lined tubular element, inserting the smaller of said elements into said seal assembly,
   (b) inserting said element with said surrounding seal assembly into the lined end of the second element,
   (c) inserting a short thin-walled metal cylinder on the inside of said assembly,
   (d) inserting into said metal cylinder an explosive assembly, and,
   (e) detonating said explosive assembly.

18. The method of claim 17 in which the explosive assembly comprises an elongated volume of explosive composition surrounded by a ring of substantially incompressible deformable shock force transmitting material in intimate shock force transmitting contact with said composition and said metal cylinder.

19. The method of claim 17 in which said thin-walled metal cylinder is positioned inside of the wall of the inner cylinder of said seal assembly.

20. Apparatus for joining and sealing one length of tubular element inside of another, comprising,
   (a) a double-walled annular cup comprising two concentric cylindrical walls attached to a ring base, the annular space between the walls adapted to receive the end of a tubular element,
   (b) a thin-walled metal cylinder inserted inside of the inner wall of said cup.

21. The apparatus of claim 20 in which the metal cylinder is positioned within the inner wall of said cup.

22. A coupling assembly apparatus for joining and sealing one tubular element inside of another, comprising,
   (a) a double-walled annular cup comprising two concentric cylindrical walls attached to a ring base, the annular space between the walls adapted to receive the end of a tubular element,
   (b) a thin-walled metal cylinder inserted inside of the inner wall of said cup,
   (c) an annular ring of substantially incompressible deformable shock force transmitting material pressed into said metal cylinder,
   (d) an elongated volume of explosive composition tightly fitted into the axial opening of said ring, and
   (e) means for detonating said composition.

23. A coupling assembly apparatus for joining and sealing two tubular elements of substantially the same diameter, comprising,
   (a) a seal assembly comprising a pair of annular cups, arranged axially back to back with inner and outer walls continuous, made of material which is substantially incompressible and deformable,
   (b) the annular spacing between said cups adapted to receive the ends of said elements,
   (c) a metal cylinder snugly fitting the inside of the inner walls, and
   (d) an explosive assembly pressed inside of said metal cylinder.

24. The coupling assembly apparatus of claim 23 with the addition of a metal tubular coupling tightly fitting the outside of said outer wall.

25. The apparatus of claim 23 in which said explosive assembly comprises at least one annular ring of substantially incompressible deformable, shock force transmitting material pressed into said metal cylinder and a volume of explosive composition in intimate contact with the inside surface of said ring.

26. The apparatus of claim 23 in which the axial depth of said annular space is in the range of 1 to 4 times the radius of said elements.

27. A sealing assembly apparatus for sealing the joint between a first tubular element and a second tubular element which are joined to each other in colinear fashion indirectly through at least one layer of sealing material to form an elongated conduit, comprising,
   (a) a first cylindrical tube of sealing material of diameter such as to snugly fit inside of said first element,
   (b) a second cylindrical tube of sealing material of diameter such as to snugly fit over the outside of said first element,
   (c) said first and second tubes substantially coextensive,
   (d) said first tube placed inside of and in alignment with said second tube,
   (e) said tubes joined into a unitary assembly by a ring of sealing material securely fitted in pressure sealing contact into the annular space between said tubes such that at least one annular space is formed between said tubes which is adapted to receive the end of said first element in pressure sealing contact,
   (f) a thin-walled metal cylinder inserted inside of and snugly fitting the inner cylindrical tube, said cylinder adapted to press said first tube into pressure sealing contact with said first element when said first element is inserted into said annular space, and
   (g) said second tube adapted to be placed in pressure sealing contact with said second element,
   whereby the joint between said first and second elements is sealed by the pressure sealing contacts between said elements and said first and second tubes.

28. The apparatus of claim 27 in which said ring is placed at one end of said cylindrical tubes, said second element is larger in diameter than said first element and the outer diameter of said second cylindrical tube is a snug pressure sealing fit into the inside of said second element.

29. The apparatus of claim 27 in which the axial length of the annular space from said ring to the end of said cylindrical tubes is approximately equal to the radius of said elements.

30. The apparatus of claim 27 in which the axial length of the annular space from said ring to the ends of said cylindrical tubes is in the range of 1 to 4 times the radius of said elements.

31. The apparatus of claim 27 in which the said thin-walled metal cylinder is positioned within the material of the inner cylindrical tube, whereby said metal cylinder is completely covered by said sealing material.

32. The apparatus of claim 27 in which the thin-walled metal cylinder is substantially coextensive with said cylindrical tubes.

33. The apparatus of claim 27 in which said cylindrical tubes are right circular cylinders.

34. The apparatus of claim 27 in which said tubular elements comprise a metal pipe and an internal liner.

35. The apparatus of claim 27 in which said second element is of the same diameter as said first element, said ring of sealing material is placed substantially midway between the ends of said cylindrical tubes, forming two annular cylindrical spaces, each adapted to receive the end of one of said elements.

36. The apparatus of claim 35 in which there are at least two rings of shock force transmitting material each axially centered within the axial extent of one of the two annular spaces.

37. The apparatus of claim 36 in which the thin-walled metal cylinder is substantially coextensive with the two rings of shock force transmitting material of said explosive assembly.

38. The apparatus of claim 35 including a tubular metal collar snugly fitting the outside of said second tube.

39. The apparatus of claim 38 with at least one ring of metal tightly fitting the outer surface of said metal collar.

40. The apparatus of claim 39 in which said tightly fitting metal ring is removable.

41. The apparatus of claim 27 in which the material of which said cylindrical tubes and said annular ring are made comprises a substantially incompressible, deformable sealing material.

42. The apparatus of claim 41 in which said sealing material is a moldable plastic of the class of polyolefins.

43. The apparatus of claim 41 in which said sealing material is an elastomer.

44. The apparatus of claim 27 with the addition of an explosive assembly fitted into the interior of said thin-walled metal cylinder.

45. The apparatus of claim 44 in which the explosive assembly comprises an axially disposed volume of explosive composition surrounded by at least one tightly fitting ring of substantially incompressible, deformable, shock force transmitting material, the outer diameter of which is a snug fit with the said thin-walled metal cylinder.

References Cited by the Examiner

UNITED STATES PATENTS

| 2,779,279 | 1/1957 | Maiwurm | 102—26 |
| 2,903,504 | 8/1959 | Tuck | 339—220 X |
| 3,036,374 | 5/1962 | Williams | 29—421 |
| 3,167,122 | 1/1965 | Lang | 72—56 X |

FOREIGN PATENTS 766,741  1/1957  Great Britain.

JOHN F. CAMPBELL, *Primary Examiner.*

THOMAS H. EAGER, *Examiner.*